(12) United States Patent
Overbeck (10) Patent No.: US 11,758,295 B2
(45) Date of Patent: *Sep. 12, 2023

(54) METHODS, SYSTEMS, AND MEDIA FOR GENERATING COMPRESSED IMAGES

(71) Applicant: GOOGLE LLC, Mountain View, CA (US)

(72) Inventor: Ryan Overbeck, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,625

(22) Filed: Oct. 12, 2021

(65) Prior Publication Data

US 2022/0030184 A1    Jan. 27, 2022

Related U.S. Application Data

(63) Continuation of application No. 16/736,469, filed on Jan. 7, 2020, now Pat. No. 11,172,148.

(51) Int. Cl.
*H04N 25/40* (2023.01)
*G06T 15/06* (2011.01)
(Continued)

(52) U.S. Cl.
CPC ............. *H04N 25/41* (2023.01); *G06T 15/06* (2013.01); *G06T 15/08* (2013.01); *G06T 15/205* (2013.01)

(58) Field of Classification Search
CPC .... H04N 5/3415; H04N 19/00; H04N 19/184; H04N 19/182; H04N 19/62; H04N 19/85;
(Continued)

(56) References Cited

U.S. PATENT DOCUMENTS 10,467,820 B2    11/2019    Mordvintsev et al.
2013/0317852 A1    11/2013    Worrell et al.
(Continued)

FOREIGN PATENT DOCUMENTS

CN    110084874 A    8/2019

OTHER PUBLICATIONS

Flynn, et al., "DeepView: View Synthesis with Learned Gradient Descent", CVPR, arXiv.org, arXiv:1906.07316, Jun. 18, 2019, 10 pages.
(Continued)

*Primary Examiner* — William A Beutel
(74) *Attorney, Agent, or Firm* — Brake Hughes Bellermann LLP (57) ABSTRACT

Methods, systems, and media for generating compressed images are provided. In some embodiments, the method comprises: identifying a multi-plane image, MPI, that represents a three-dimensional image, wherein the MPI comprises a plurality of fronto-parallel planes; splitting the MPI into a plurality of sub-volumes, wherein each sub-volume in the plurality of sub-volumes includes a subset of the plurality of fronto-parallel planes; calculating, for each sub-volume of the MPI, a depthmap; converting each depthmap to a mesh, wherein each mesh corresponds to a layer of a plurality of layers associated with a multi-depth image, MDI, to be rendered; calculating, for each layer of the plurality of layers, an image; and storing the meshes corresponding to the plurality of layers of the MDI and the images corresponding to the plurality of layers of the MDI as the MDI.

21 Claims, 6 Drawing Sheets

(51) Int. Cl.
*G06T 15/08* (2011.01)
*G06T 15/20* (2011.01)

(58) Field of Classification Search
CPC .. H04N 13/161; H04N 13/189; H04N 13/194; G06T 15/06; G06T 15/08; G06T 15/205; G06T 15/04; G06T 5/002; G06T 7/50; G06T 17/20
See application file for complete search history.

(56) References Cited

U.S. PATENT DOCUMENTS

| | | | |
|---|---|---|---|
| 2020/0228774 A1 | 7/2020 | Kar et al. | |
| 2020/0273188 A1* | 8/2020 | Hamilton | H04N 19/597 |
| 2021/0250571 A1 | 8/2021 | Xu et al. | |

OTHER PUBLICATIONS

Taniai, et al., "Continuous 3D Label Stereo Matching Using Local Expansion Moves", MS Technical Report, arXiv.org, arXiv:1603.08328, Oct. 17, 2017, 20 pages.
Office Action with English Translation for Korean Application No. 10-2020-0116879, dated Apr. 8, 2022, 9 pages.
Extended European Search Report for European Application No. 20196051.5, dated Feb. 16, 2021, 6 pages.
Broxton, et al., "Immersive light field video with a layered mesh representation", ACM Translations on Graphics, vol. 39, No. 4, Jul. 2020, 15 pages, XP058458680.
Chilamkurthy, "A 2017 Guide to Semantic Segmentation with Deep Learning", Qure.ai Blog, last updated Jul. 5, 2017, available at: http://blog.qure.ai/notes/semantic-segmentation-deep-learning-review., Jul. 5, 2017, pp. 1-7.
Jantet, et al., "Object-based Layered Depth Images for Improved Virtual View Synthesis in Rate-Constrained Context", 2011 18th IEEE International Conference on Image Processing, Sep. 11, 2011, pp. 125-128, XP032079814.
Mildenhall, et al., "Local Light Field Fusion: Practical View Synthesis with Prescriptive Sampling Guidelines", ACM Transactions of Graphics, vol. 38, No. 4, Jul. 2019, pp. 1-14.
Overbeck, et al., "A System for Acquiring, Processing, and Rendering Panoramic Light Field Stills for Virtual Reality", ACM Transactions on Graphics, vol. 37, No. 6, Nov. 2018, pp. 1-15.
Zheng, et al., "Conditional Random Fields as Recurrent Neural Networks", Proceedings of the International Conference on Computer Vision, Santiago, Chile, Dec. 2015, pp. 1-17.
Zhou, et al., "Stereo Magnification: Learning View Synthesis Using Multiplane Images", ACM Transactions on Graphics, vol. 37, No. 4, Aug. 2018, pp. 1-12.
U.S. Appl. No. 16/736,469, filed Jan. 7, 2020, Allowed.
Chinese Office Action for CN Application No. 202010959566.2, dated May 25, 2023, with English Translation, 12 pages.

* cited by examiner

METHODS, SYSTEMS, AND MEDIA FOR GENERATING COMPRESSED IMAGES

CROSS REFERENCE TO RELATED APPLICATION

This application is a continuation of, and claims priority to U.S. application Ser. No. 16/736,469, filed Jan. 7, 2020, the disclosure of which is incorporated by reference herein in its entirety.

TECHNICAL FIELD

The disclosed subject matter relates to methods, systems, and media for generating compressed images. More particularly, the disclosed subject matter relates to generating multi-depth images or compressed representations of multi-plane images.

BACKGROUND

With the proliferation of virtual reality content and other three-dimensional or immersive content, users are increasingly interested in downloading, streaming, and viewing content that is relatively resource-intensive to render. For example, three-dimensional videos or images may be stored as relatively large files on a server. However, these large files can be difficult or cumbersome to store. Additionally, in some cases, three-dimensional content may be stored as a file that includes multiple layers which are then layered or composited to form the three-dimensional content. Such content can be resource-intensive to render on a user device.

Accordingly, it is desirable to provide new methods, systems, and media for generating compressed images.

SUMMARY

Methods, systems, and media for generating compressed images are provided.

In accordance with some embodiments of the disclosed subject matter, a method for generating compressed images is provided, the method comprising: identifying a multi-plane image (MPI) that represents a three-dimensional image, wherein the MPI comprises a plurality of fronto-parallel planes, each associated with an image that indicates a color and a transmittance of each pixel of the fronto-parallel planes; splitting the MPI into a plurality of sub-volumes, wherein each sub-volume in the plurality of sub-volumes includes a subset of the plurality of fronto-parallel planes; calculating, for each sub-volume of the MPI, a depthmap; converting each depthmap to a mesh, wherein each mesh corresponds to a layer of a plurality of layers associated with a multi-depth image (MDI) to be rendered, wherein each depthmap indicates a location and a depth of each voxel of the MDI included in the corresponding layer of the MDI, and wherein a number of layers in the plurality of layers associated with the MDI is less than a number of fronto-parallel planes included in the plurality of fronto-parallel planes associated with the MPI; calculating, for each layer of the plurality of layers, an image that indicates a color and a transmittance of each voxel included in the layer; storing the meshes corresponding to the plurality of layers of the MDI and the images corresponding to the plurality of layers of the MDI as the MDI; and, in response to receiving a request for the three-dimensional image from a user device, transmitting the MDI to the user device, wherein the user device is configured to render the MDI by mapping, for each layer of the MDI, the image corresponding to the layer as a texture on the mesh corresponding to the layer.

In some embodiments, the method further comprises generating a sequence of MDI images corresponding to a sequence of MPI images, where the sequence of MPI images corresponds to three-dimensional video content.

In some embodiments, splitting the MPI into the plurality of sub-volumes comprises optimizing a plurality of cuts that generate the plurality of sub-volumes by minimizing a rendering error generated by rendering the MDI using the plurality of sub-volumes.

In some embodiments, the rendering error comprises a unary term that indicates an error in depth resulting from rendering the MDI using a cut of the plurality of the cuts.

In some embodiments, the rendering error comprises a smoothness term that indicates a smoothness of a cut of the plurality of cuts across voxels included in the sub-volume corresponding to the cut.

In some embodiments, splitting the MPI into the plurality of sub-volumes comprises using a trained neural network to identify a plurality of cuts that generate the plurality of sub-volumes.

In some embodiments, each mesh corresponding to each layer of the MDI is a triangular mesh.

In accordance with some embodiments of the disclosed subject matter, a system for generating compressed images is provided, the system comprising a hardware processor that is configured to: identify a multi-plane image (MPI) that represents a three-dimensional image, wherein the MPI comprises a plurality of fronto-parallel planes, each associated with an image that indicates a color and a transmittance of each pixel of the fronto-parallel planes; split the MPI into a plurality of sub-volumes, wherein each sub-volume in the plurality of sub-volumes includes a subset of the plurality of fronto-parallel planes; calculate, for each sub-volume of the MPI, a depthmap; convert each depthmap to a mesh, wherein each mesh corresponds to a layer of a plurality of layers associated with a multi-depth image (MDI) to be rendered, wherein each depthmap indicates a location and a depth of each voxel of the MDI included in the corresponding layer of the MDI, and wherein a number of layers in the plurality of layers associated with the MDI is less than a number of fronto-parallel planes included in the plurality of fronto-parallel planes associated with the MPI; calculate, for each layer of the plurality of layers, an image that indicates a color and a transmittance of each voxel included in the layer; store the meshes corresponding to the plurality of layers of the MDI and the images corresponding to the plurality of layers of the MDI as the MDI; and, in response to receiving a request for the three-dimensional image from a user device, transmit the MDI to the user device, wherein the user device is configured to render the MDI by mapping, for each layer of the MDI, the image corresponding to the layer as a texture on the mesh corresponding to the layer.

In accordance with some embodiments of the disclosed subject matter, a non-transitory computer-readable medium containing computer executable instructions that, when executed by a processor, cause the processor to perform a method for generating compressed images is provided, the method comprising: identifying a multi-plane image (MPI) that represents a three-dimensional image, wherein the MPI comprises a plurality of fronto-parallel planes, each associated with an image that indicates a color and a transmittance of each pixel of the fronto-parallel planes; splitting the MPI into a plurality of sub-volumes, wherein each sub-volume in the plurality of sub-volumes includes a subset of the plurality of fronto-parallel planes; calculating, for each sub-volume of the MPI, a depthmap; converting each depthmap to a mesh, wherein each mesh corresponds to a layer of a plurality of layers associated with a multi-depth image (MDI) to be rendered, wherein each depthmap indicates a location and a depth of each voxel of the MDI included in the corresponding layer of the MDI, and wherein a number of layers in the plurality of layers associated with the MDI is less than a number of fronto-parallel planes included in the plurality of fronto-parallel planes associated with the MPI; calculating, for each layer of the plurality of layers, an image that indicates a color and a transmittance of each voxel included in the layer; storing the meshes corresponding to the plurality of layers of the MDI and the images corresponding to the plurality of layers of the MDI as the MDI; and, in response to receiving a request for the three-dimensional image from a user device, transmitting the MDI to the user device, wherein the user device is configured to render the MDI by mapping, for each layer of the MDI, the image corresponding to the layer as a texture on the mesh corresponding to the layer.

In accordance with some embodiments of the disclosed subject matter, a system for generating compressed images is provided, the system comprising: means for identifying a multi-plane image (MPI) that represents a three-dimensional image, wherein the MPI comprises a plurality of fronto-parallel planes, each associated with an image that indicates a color and a transmittance of each pixel of the fronto-parallel planes; means for splitting the MPI into a plurality of sub-volumes, wherein each sub-volume in the plurality of sub-volumes includes a subset of the plurality of fronto-parallel planes; means for calculating, for each sub-volume of the MPI, a depthmap; means for converting each depthmap to a mesh, wherein each mesh corresponds to a layer of a plurality of layers associated with a multi-depth image (MDI) to be rendered, wherein each depthmap indicates a location and a depth of each voxel of the MDI included in the corresponding layer of the MDI, and wherein a number of layers in the plurality of layers associated with the MDI is less than a number of fronto-parallel planes included in the plurality of fronto-parallel planes associated with the MPI; means for calculating, for each layer of the plurality of layers, an image that indicates a color and a transmittance of each voxel included in the layer; means for storing the meshes corresponding to the plurality of layers of the MDI and the images corresponding to the plurality of layers of the MDI as the MDI; and means for transmitting the MDI to the user device in response to receiving a request for the three-dimensional image from a user device, wherein the user device is configured to render the MDI by mapping, for each layer of the MDI, the image corresponding to the layer as a texture on the mesh corresponding to the layer.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for generating compressed images are provided.

In some embodiments, the mechanisms described herein can generate compressed images corresponding to three-dimensional images or other immersive content. For example, in some embodiments, a three-dimensional image can be a multi-plane image (MPI) that includes a collection of any suitable number of fronto-parallel planes (e.g., fifty planes, one hundred planes, five hundred planes, and/or any other suitable number), each associated with a Red-Green-Blue-Alpha (RGBA) image. In some embodiments, an MPI image can be rendered by over-compositing each of the RGBA images of each of the planes. In some embodiments, the mechanisms described herein can generate a multi-depth image (MDI) corresponding to the MPI, where the MDI is a relatively simpler representation of the MPI. For example, in some embodiments, the mechanisms described herein can generate an MDI that includes a number of layers that is less than the number of fronto-parallel planes associated with the MPI. In some such embodiments, each layer of the MDI can be associated with a mesh that indicates depths of pixels corresponding to the layer of the MDI as well as an RGBA image that indicates a texture that is to be mapped to the mesh.

In some embodiments, the mechanisms can generate a series of MDI images corresponding to a series of MPI images. For example, in some embodiments, a series of MPI images can correspond to frames of video content (e.g., to a video that includes three-dimensional video content, virtual reality content, and/or any other suitable type of three-dimensional video content). Continuing with this example, in some embodiments, the mechanisms can iterate through the series of MPI images and generate a corresponding series of MDI images, thereby generating a compressed version of the three-dimensional video content.

Note that, in some embodiments, the mechanisms described herein can be executed by any suitable device. For example, in some embodiments, a server that stores video content and/or transmits video content to user devices can generate a sequence of MDI images corresponding to a video and can then transmit the sequence of MDI images to a user device in response to a request for the video.

In some embodiments, the mechanisms described herein can generate the MDI images using any suitable technique or combination of techniques. For example, as shown in and described below in connection with FIG. 2, in some embodiments, the mechanisms can generate an MDI image from an MPI image by cutting the MPI image into a series of sub-volumes, each corresponding to a layer of the MDI image. Continuing with this example, in some embodiments, the mechanisms can then calculate a mesh and an RGBA texture image that is to be mapped on to the mesh for each layer. As another example, as shown in and described below in connection with FIG. 3, in some embodiments, the mechanisms can generate an MDI using a machine learning algorithm that has been trained to generate MDI images from an MPI image. As described below in more detail in connection with FIG. 3, in some embodiments, the mechanisms can use gradient descent to iteratively refine a mesh and an RGBA image to be mapped on to the image for each layer of the MDI to minimize an error between an MDI rendered using the mesh and the RGBA image and a ground-truth MPI image.

These and other features for generating multi-depth images or compressed representations of multi-plane images are described further in connection with FIGS. 1-6.

Figure 1:
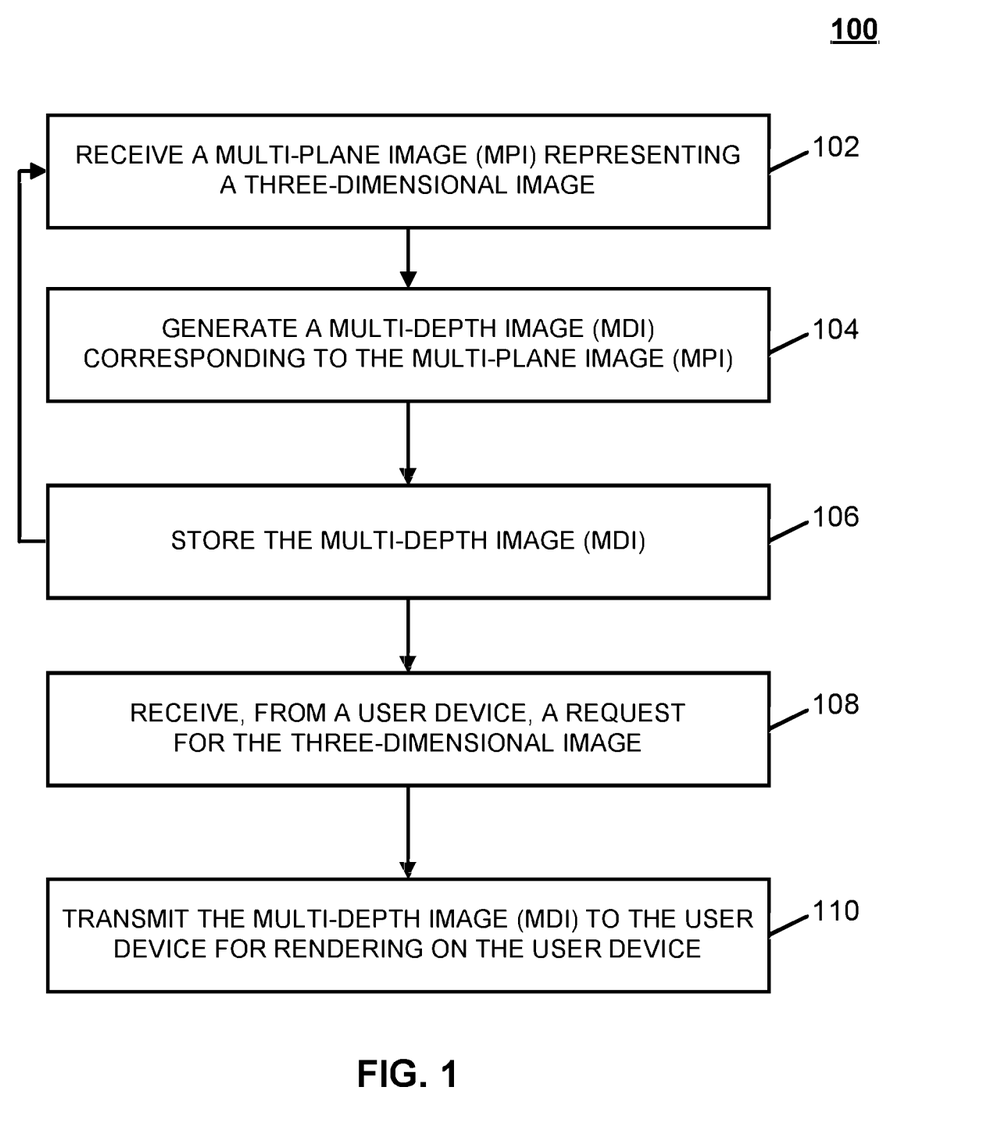
FIG. 1 shows an illustrative example of a process for generating compressed images and transmitting compressed images to a user device in accordance with some embodiments of the disclosed subject matter.

Turning to FIG. 1, an illustrative example 100 of a process for generating compressed images and transmitting compressed images to a user device is shown in accordance with some embodiments of the disclosed subject matter. Note that, in some embodiments, blocks of process 100 can be implemented on a server. For example, in some embodiments, process 100 can be implemented on a server associated with a video sharing service, a server associated with a social networking platform, and/or any other suitable server.

Figure 6:
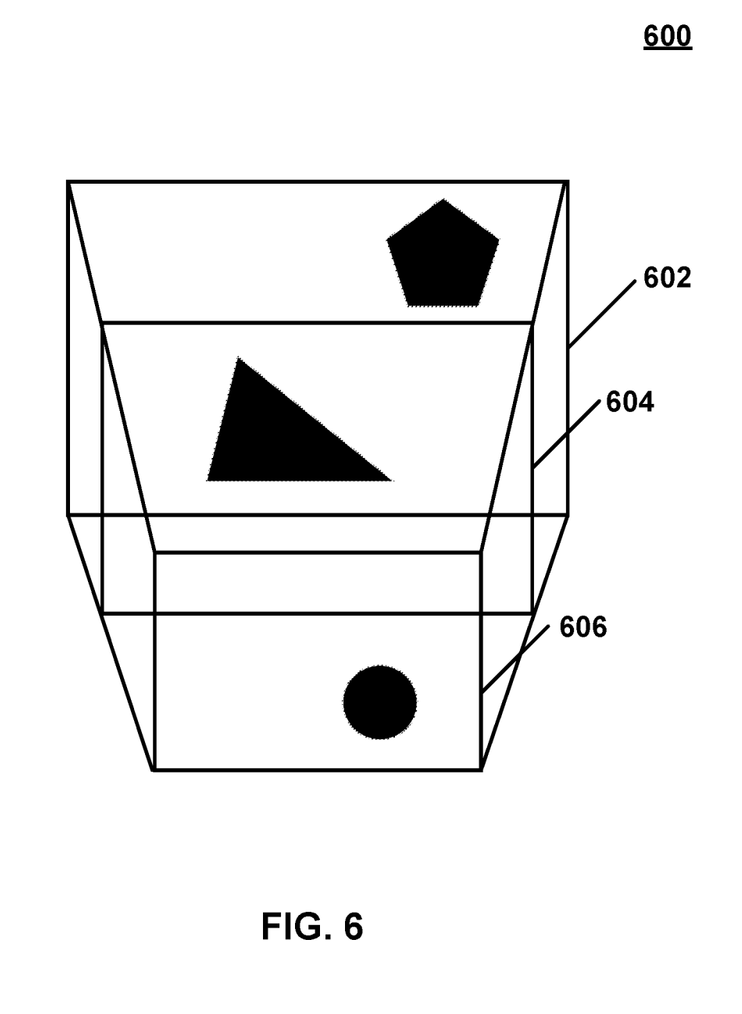
FIG. 6 shows a schematic diagram of a multi-plane image in accordance with some embodiments of the disclosed subject matter.

Process 100 can begin at 102 by receiving a multi-plane image (MPI) corresponding to a three-dimensional image. In some embodiments, an MPI can be a collection or a group of fronto-parallel planes, where each plane is associated with a corresponding RGBA image that indicates a color and a transparency of each pixel of the plane. Turning to FIG. 6, an example 600 of an MPI is shown in accordance with some embodiments of the disclosed subject matter. As illustrated, MPI 600 can include individual fronto-parallel planes, such as planes 602, 604, and/or 606. In some embodiments, MPI 600 can be rendered on a user device by over-compositing the individual planes using the RGBA image associated with each plane. For example, in some embodiments, MPI 600 can be rendered by over-compositing the planes back to front, such that plane 604 is composited on plane 602, and plane 606 is composited on plane 604. Note that, although MPI 600 shows three fronto-parallel planes, the number of illustrated planes is merely exemplary. In some embodiments, an MPI can include any suitable number of planes (e.g., one hundred, two hundred, one thousand, and/or any other suitable number of planes). Additionally, note that, in some embodiments, each plane can have any suitable width and/or height.

Referring back to FIG. 1, in some embodiments, process 100 can receive the MPI in any suitable manner. For example, in some embodiments, process 100 can identify the MPI as an image in a series of MPI images. As a more particular example, in some embodiments, the series of MPI images can correspond to a three-dimensional video or other immersive content, where the received MPI corresponds to a frame of the video or content. In some such embodiments, process 100 can iterate through the frames of the video to generate a compressed video by compressing each MPI image using the techniques described below in connection with block 104.

At 104, process 100 can generate a multi-depth image (MDI) corresponding to the MPI. In some embodiments, the MDI can be a compressed representation of the MPI. For example, in some embodiments, the MDI can include any suitable number of layers, where the number of layers is less than the number of fronto-parallel planes of the MPI. As a more particular example, in an instance in which the MPI has one hundred fronto-parallel planes, the generated MDI can have any suitable number of layers less than one hundred, such as eight, ten, 15, and/or any other suitable number. In some embodiments, each layer of the MDI can be associated with a mesh that represents depths of the voxels included in the layer of the MDI. Additionally, in some embodiments, each layer of the MDI can be associated with an RGBA image that indicates a texture that is to be mapped onto the mesh corresponding to the layer during rendering of the MDI. In some embodiments, a generated MDI can be stored as a series of meshes corresponding to a series of layers of the MDI, where each mesh in the series of meshes is associated with a stored RGBA texture image.

In some embodiments, process 100 can generate the MDI in any suitable manner. For example, as shown in and described below in more detail in connection with FIG. 2, in some embodiments, process 100 can generate the MDI by cutting the MPI received at block 102 into a series of sub-volumes corresponding to each layer of the MDI and generating the meshes and RGBA textures for each sub-volume. As another example, in some embodiments, process 100 can generate the MDI using a trained neural network. Note that techniques for training a neural network to generate an MDI are shown in and described below in more detail in connection with FIG. 3.

At 106, process 100 can store the MDI. In some embodiments, process 100 can store the MDI in any suitable manner. For example, in some embodiments, process 100 can store the MDI as one or more files that include the generated meshes corresponding to each layer of the MDI and a corresponding RGBA texture map to be mapped to the mesh. As another example, in some embodiments, the MDI can be stored with an identifier that associates the MDI with the MPI from which the MDI was generated.

Note that, in some embodiments, process 100 can loop back to block 102 and receive another MPI. For example, in an instance in which process 100 is generating a compressed video from a video that includes a series of frames, where each frame is an MPI, process 100 can loop back to 102 to identify or receive a next frame in the series of frames. In some such embodiments, process 100 can loop through blocks 102-106 to iterate through each of the frames in the series of frames.

At 108, process 100 can receive, from a user device, a request for the three-dimensional image. In some embodiments, process 100 can receive the request in any suitable manner. For example, in some embodiments, process 100 can receive a request from the user device to stream or download video content, virtual reality content, and/or immersive content that includes the three-dimensional image. Note that, in some embodiments, the video content, virtual reality content, or other type of immersive content can include any suitable genre of content, such as videos, advertisements, video games, and/or any other suitable type of content.

At 110, process 100 can transmit the MDI to the user device for rendering on the user device. In some embodiments, process 100 can transmit the MDI in any suitable manner. For example, in some embodiments, process 100 can transmit a file that includes the meshes corresponding to each layer of the MDI and the RGBA texture map corresponding to each layer of the MDI to the user device. As another example, in some embodiments, process 100 can transmit instructions for rendering the MDI to the user device. Note that, in instances in which the request from the user device received at block 108 was for a video or other series of images, process 100 can transmit a series of MDI images corresponding to the requested video or series of images.

Figure 2:
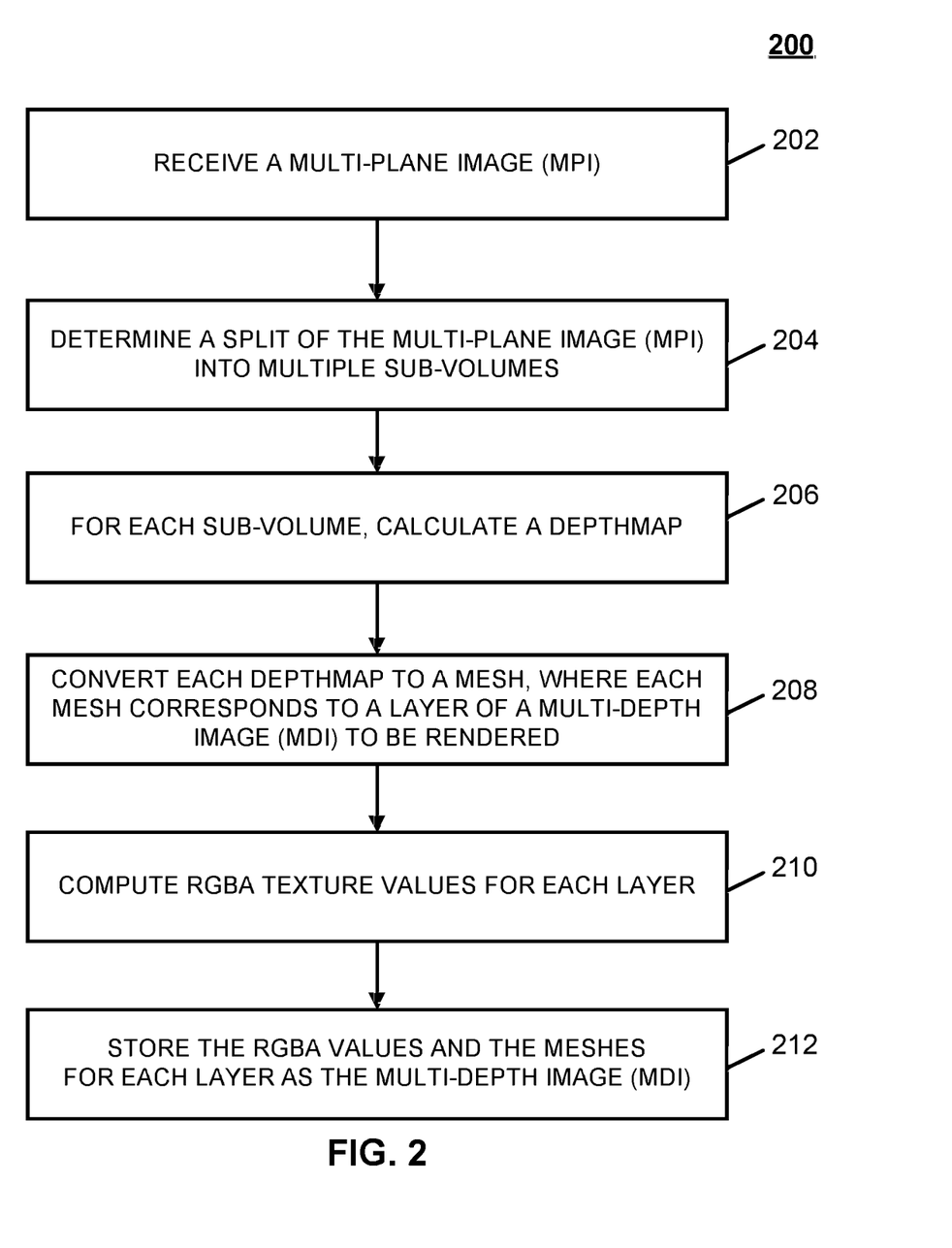
FIG. 2 shows an illustrative example of a process for generating compressed images by optimizing cuts of a multi-plane image (MPI) in accordance with some embodiments of the disclosed subject matter.

Turning to FIG. 2, an illustrative example 200 of a process for generating an MDI from an MPI by cutting the MPI into a group of sub-volumes is shown in accordance with some embodiments of the disclosed subject matter. Note that, in some embodiments, blocks of process 200 can be executed on any suitable device, such as a server that stores MPIs (e.g., a server associated with a video hosting service, a server associated with a social networking service, and/or any other suitable server).

Process 200 can begin at 202 by receiving an MPI. In some embodiments, process 200 can receive the MPI in any suitable manner. For example, in some embodiments, similarly to as described above in connection with block 102 of FIG. 1, process 200 can receive an MPI that corresponds to a frame in a series of frames of a video. As another example, in some embodiments, process 200 can receive an indication of the MPI from a different process (e.g., process 100 as shown in and described above in connection with FIG. 1) that is identifying an MPI and storing an MDI corresponding to the MPI.

At 204, process 200 can determine a split of the MPI into multiple sub-volumes. In some embodiments, process 200 can split the MPI into multiple sub-volumes in any suitable manner. For example, in some embodiments, each fronto-parallel plane included in the MPI can span an x and y axis, and the series of fronto-parallel planes can be arranged along a z axis. Continuing with this example, in some embodiments, process 200 can split the MPI by cutting along the z axis. That is, in some embodiments, process 200 can split the MPI such that multiple fronto-parallel planes associated with the MPI are included in each sub-volume of the MPI. Note that, in some embodiments, each sub-volume can correspond to a layer of the MDI that is to be generated. In some embodiments, process 200 can split the MPI into any suitable number of sub-volumes (e.g., eight, ten, 15, and/or any other suitable number).

In some embodiments, process 200 can determine the split of the MPI into multiple sub-volumes using any suitable technique or combination of techniques. For example, in some embodiments, process 200 can use a graph cut algorithm to recursively divide the MPI into the multiple sub-volumes. For example, to generate four sub-volumes, process 200 can identify a first cut of the MPI to generate a first sub-volume and a second sub-volume. Continuing with this example, process 200 can then identify a second cut of the first sub-volume and a third cut of the second sub-volume, to generate a total of four sub-volumes. Note that, although the preceding example describes a technique to generate four sub-volumes, in some embodiments, process 200 can repeat the above described technique to generate any suitable number of sub-volumes.

In some embodiments, process 200 can identify a cut of the MPI or of a sub-volume of the MPI in any suitable manner. For example, in some embodiments, identifying a cut of the MPI or of the sub-volume of the MPI can include determining a value along the z-axis of the MPI for each (x, y) pixel location. Note that, in some embodiments, a cut of the MPI or of the sub-volume of the MPI can include a different number of planes of the MPI at different (x, y) locations. For example, in some embodiments, a first location $(x_1, y_1)$ can include ten fronto-parallel planes of the MPI at a first cut depth $z_1$, and a second location $(x_2, y_2)$ can include twenty fronto-parallel planes of the MPI at a second cut depth $z_2$.

In some embodiments, after splitting the MPI into the group of sub-volumes, process 200 can calculate one or more error values that indicate an error that would be generated when rendering the image using the sub-volumes generated by the cut(s). In some embodiments, process 200 can then use any suitable optimization algorithm to iteratively modify the cut(s) of the MPI to minimize the one or more error values.

In some embodiments, the one or more error values can represent any suitable rendering heuristics. For example, in some embodiments, the one or more error values can include a unary term. As a more particular example, in some embodiments, the unary term can be determined using the equation:

$$e_s = \Sigma_{p<s} a_p (b_s - p)^2 + \Sigma_{p \geq s} a_p (f_s - p)^2.$$

In some embodiments, s can represent a proposed z value for a split, $a_p$ can represent a transmittance at p, $b_s$ can indicate a resulting back depth for a split at s, and $f_s$ can indicate a resulting front depth. In other words, a split at s will result in depth values of $b_s$ and fs on either side of s. Therefore, every other voxel of the MPI that is not at $b_s$ and $f_s$ will be represented by $b_s$ and $f_s$, which will therefore induce some error represented by the unary error term. That is, in some embodiments, the unary term can represent an error in depth of an MDI rendered using the cut at s.

Note that, in some embodiments, the transmittance terms $a_p$ can be calculated using any suitable technique or combination of techniques. For example, in some embodiments, process 200 can take the alpha value included in the RGBA image for the corresponding voxel of the MPI as $a_p$. As another example, in some embodiments, process 200 can calculate the value $a_p$. As a more particular example, in some embodiments, process 200 can cast a series of rays from a series of potential viewpoints through the voxel. Continuing with this example, in some embodiments, process 200 can accumulate the alpha values along the ray such that an effective alpha contribution from the voxel along the ray is calculated when the ray reaches the viewpoint. In some embodiments, the accumulated alpha value can be considered the transmittance of that voxel. An example equation for calculating the transmittance for a ray is:

$$a_p = \Pi_{i<p}(1 - a_i),$$

where $a_i$ is the alpha value at depth i along the ray. In some embodiments, process 200 can take a maximum transmittance of all of the rays in the series of rays. Alternatively, in some embodiments, process 200 can calculate an average transmittance of all of the rays in the series of rays. In some embodiments, a transmittance for the full MPI volume can be computed and can be passed as an input when errors are calculated and optimized during splitting of the MPI.

In some embodiments, the one or more error values can include a smoothness term. In some embodiments, process 200 can iteratively modify cuts of the MPI to optimize a smoothness term to encourage smoothness in depthmaps that result from the splits of the MPI. In some embodiments, the smoothness term cs can be: $c_s = (b_{s_0} - b_{s_1})^2 (f_{s_0} - f_{s_1})^2$. In some embodiments, $b_{s_0}$ can be the back depth at pixel location 0, and $b_{s_1}$ is the back depth at neighboring pixel location 1. Similarly, in some embodiments, $f_{s_0}$ can be the front depth at pixel location 0, and $f_{s_1}$ is the front depth location at neighboring pixel location 1.

Note that, in some embodiments, rather than iteratively refining cuts of the MPI to minimize a rendering error, process 200 can split the MPI into multiple sub-volumes in any other suitable manner. For example, in some embodiments, process 200 can use a trained neural network (e.g., a convolutional neural network, and/or any other suitable type of neural network) that has been trained to identify cuts of an MPI to generate an MDI with a minimized rendering error.

At 206, process 200 can calculate a depthmap for each sub-volume. In some embodiments, process 200 can calculate the depthmap for each sub-volume in any suitable manner. For example, in some embodiments, process 200 can calculate the depthmap for a particular sub-volume that is bounded by two splits, $s_1$ and $s_2$, by over-compositing the fronto-parallel planes bounded by $s_1$ and $s_2$ using the MPI alpha values at each voxel.

At 208, process 200 can convert each depthmap to a mesh, where each mesh corresponds to a layer of the MDI to be rendered. In some embodiments, process 200 can generate the mesh in any suitable manner and using any suitable technique(s). For example, in some embodiments, process 200 can triangulate the depthmap by generating two triangles at each depth pixel. Continuing with this example, in some embodiments, process 200 can then connect the pixel corners to generate a triangular mesh. In some embodiments, process 200 can use any suitable simplification algorithm to, for example, reduce a number of faces included in the triangular mesh while maintaining an overall shape, volume, and/or boundaries of the triangular mesh. In some embodiments, process 200 can use any suitable simplification algorithm (e.g., the Lindstrom-Turk mesh simplification algorithm, and/or any other suitable algorithm).

At 210, process 200 can compute RGBA texture values for each layer of the MDI. Note that, in some embodiments, process 200 can compute the RGBA texture values in any suitable manner. For example, in some embodiments, process 200 can calculate an over-composite of the RGBA values associated with the original MPI received at block 202 within the bounds of the sub-volume corresponding to the layer.

Note that, in some embodiments, process 200 can perform any suitable technique(s) to smooth and/or reduce artifacts induced by the generation of the MDI from the MPI. For example, in some embodiments, process 200 can generate a set of candidate viewpoints that are randomly selected. Continuing with this example, in some embodiments, process 200 can cast several rays through each pixel on each MDI mesh from the set of candidate viewpoints. In some embodiments, process 200 can then compute the over-composite of the RGBA values along each ray, and process 200 can average the results over all of the rays through the pixel. In some embodiments, process 200 can use the resultant average over all of the rays through the pixel as the RGBA value for a corresponding pixel of the layer.

Additionally, note that, in some embodiments, in instances in which process 200 generates a series of MDIs that correspond to a series of frames of a video, process 200 can generate the MDIs in a temporally coherent manner using any suitable technique(s), thereby avoiding flickering.

At 212, process 200 can store the RGBA values and the meshes corresponding to each layer of the MDI as the MDI. In some embodiments, process 200 can store the RGBA values and the meshes in any suitable manner. For example, in some embodiments, process 200 can generate a file that includes the RGBA values and the meshes. As another example, in some embodiments, process 200 can store the MDI in connection with an identifier that associates the generated MDI with the MPI received at block 202.

Note that, in some embodiments, an MDI generated by optimizing cuts of an MPI to generate layers of the MDI can produce an MDI that has geometry and/or colors that are optimized for a central view of the MDI. In some such embodiments, the resultant MDI can degrade when projected away from a central view. In some embodiments, generating an MDI using a neural network or other machine learning algorithm that optimizes over a final rendered error of an MDI projected from different viewpoints can produce an MDI with less degradation when rendered from different viewpoints.

Figure 3:
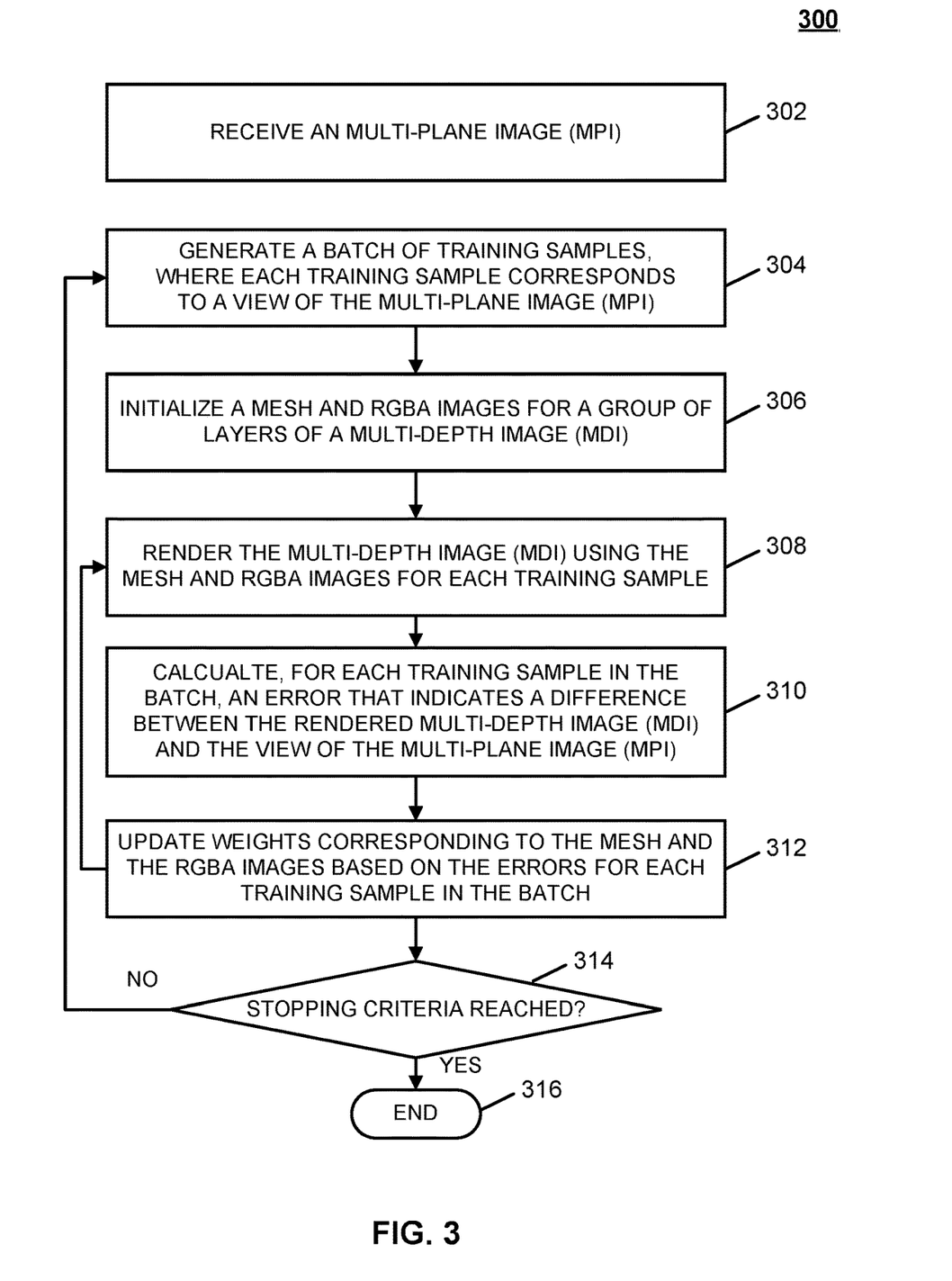
FIG. 3 shows an illustrative example of a process for training a neural network to generate compressed images in accordance with some embodiments of the disclosed subject matter.

Turning to FIG. 3, an illustrative example 300 of a process for training a neural network to generate an MDI is shown in accordance with some embodiments of the disclosed subject matter. Note that, in some embodiments, blocks of process 300 can be executed by any suitable device. For example, in some embodiments, blocks of process 300 can be executed by a server that stores images or videos, such as a server associated with a video sharing service, a server associated with a social networking service, and/or any other suitable server.

Note that the techniques described below in connection with process 300 describe training a neural network to generate an MDI. In some embodiments, the neural network can have any suitable topology. For example, in some embodiments, the neural network can have any suitable number of layers that are connected in any suitable manner. As another example, in some embodiments, the neural network can have any suitable number of inputs corresponding to any suitable parameters, such as a size of an MPI from which an MDI is to be generated, and/or any other suitable inputs or parameters.

Process 300 can begin at 302 by receiving an MPI. In some embodiments, process 300 can receive the MPI in any suitable manner. For example, in some embodiments, similarly to as described above in connection with block 102 of FIG. 1 and block 202 of FIG. 2, process 300 can receive an MPI that corresponds to a frame in a series of frames of a video. As another example, in some embodiments, process 300 can receive an indication of the MPI from a different process (e.g., process 100 as shown in and described above in connection with FIG. 1), where the process identifies an MPI and stores an MDI corresponding to the MPI.

As yet another example, in some embodiments, process 300 can generate an MPI. In some embodiments, process 300 can generate the MPI in any suitable manner and using any suitable technique(s). For example, in some embodiments, process 300 (or any other suitable process) can generate the MPI using any suitable algorithm that has been trained to generate an MPI using any suitable sparse set of camera images from any suitable viewpoints. In some embodiments, the algorithm can include any suitable type of algorithm, such as an algorithm that uses learned gradient descent to minimize a rendering error of a generated MPI, and/or any other suitable type of algorithm. For example, in some embodiments, learned gradient descent can be applied to a neural network with any suitable topology (e.g., a convolutional neural network, and/or any other suitable type of neural network) that takes as input a sparse set of views (e.g., from any suitable number of cameras associated with a camera rig) and that generates an initial MPI image using the input sparse set of views. Continuing with this example, in some embodiments, learned gradient descent can then be used to iteratively improve the MPI using updates to any suitable weights or parameters that are used to generate the MPI (e.g., weights or parameters corresponding to colors of each pixel of each plane of the MPI, weights or parameters corresponding transmittances of each pixel of each plane of the MPI, and/or any other suitable weights or parameters).

At 304, process 300 can generate a batch of training samples, where each training sample corresponds to a view of the MPI. Note that, in some embodiments, the batch can include any suitable number (e.g., ten, twenty, 32, and/or any other suitable number) of training samples. In some embodiments, each training sample in the batch of training samples can correspond to a different viewpoint associated with the MPI. In some embodiments, process 300 can identify the different viewpoints corresponding to each training sample in the batch in any suitable manner to ensure that the viewpoints are distributed over a view volume of the MPI. For example, in some embodiments, process 300 can use any suitable stratified sampling technique to divide the view volume of the MPI into any suitable number of strata, each corresponding to a different group of viewpoints and can select the training samples in the batch of training samples randomly from within each strata.

At 306, process 300 can initialize, for each layer in a group of layers of an MDI, a mesh and an RGBA image. In some embodiments, each mesh can have any suitable size and/or geometry. For example, in some embodiments, each mesh can be an 8×8 pixel quad. Continuing with this example, in some embodiments, each pixel quad can include any suitable number of triangles (e.g., two, and/or any other suitable number) that are then connected at a vertex to generate a triangular mesh. Note that the mesh described above is merely exemplary, and, in some embodiments, a mesh can have any suitable size (e.g., a 4×4 pixel quad, an 8×8 pixel quad, a 16×16 pixel quad, and/or any other size), with faces of any suitable geometry. In some embodiments, each RGBA image can have a size corresponding to a size of a fronto-parallel plane of the MPI. That is, in some embodiments, each RGBA image can have a number of pixels that corresponds to a number of pixels of a fronto-parallel plane of the MPI.

In some embodiments, process 300 can initialize the meshes and the RGBA images in any suitable manner. For example, in some embodiments, process 300 can initialize the mesh where each (x, y) point of the mesh is initialized to a location based on location information of a group of fronto-parallel planes of the MPI corresponding to the mesh. As another example, in some embodiments, process 300 can initialize depth values associated with each mesh in any suitable manner (e.g., to a random value within a predetermined range, to a value corresponding to zero depth, and/or any other suitable value).

Note that, in some embodiments, the MDI can be associated with any suitable number of layers (e.g., four, eight, sixteen, and/or any other suitable number), as described above in connection with FIGS. 1 and 2. Additionally, note that, in some embodiments, process 300 can determine how many layers the MDI is to have based on any suitable information. For example, in some embodiments, process 300 can determine the number of layers based on a size of the mesh that is initialized. As a more particular example, in some embodiments, process 300 can determine that the MDI is to be associated with relatively fewer layers (e.g., four) based on the mesh associated with each layer being relatively larger (e.g., a 16×16 pixel quad, a 32×32 pixel quad, and/or any other suitable size mesh). Conversely, in some embodiments, process 300 can determine that the MDI is to be associated with relatively more layers (e.g., eight, sixteen, and/or any other suitable number of layers) based on the mesh associated with each layer being relatively smaller (e.g., an 8×8 pixel quad, and/or any other suitable size mesh). Note that, in some embodiments, process 300 can determine a number of layers associated with the MDI and a size of each mesh corresponding to each layer to optimize any suitable tradeoffs and based on any suitable information. For example, in some embodiments, process 300 can determine a number of layers associated with the MDI and a size of each mesh corresponding to each layer based on a complexity of the MPI (e.g., a number of fronto-parallel planes included in the MPI, and/or based on any other complexity information), a predicted duration of time for a neural network to converge during training based on previous neural network training data, and/or based on any other suitable information.

At 308, process 300 can render the MDI using the mesh and the RGBA images for each training sample in the batch. In some embodiments, process 300 can render the MDI using any suitable technique or combination of techniques. For example, in some embodiments, process 300 can map the RGBA images as a texture onto the mesh for each layer of the MDI.

At 310, process 300 can calculate, for each training sample in the batch, a loss or an error that indicates a difference between the MDI rendered for the training sample at block 308 and the corresponding view of the MPI. That is, in some embodiments, process 300 can calculate a loss or an error between the rendered MDI and the corresponding view of the MPI, where the view of the MPI is considered a ground-truth to which the rendered MDI is compared. Note that, in some embodiments, process 300 can calculate the loss or the error for the training sample by evaluating a loss function using the rendered MDI and the corresponding ground-truth MPI image.

At 312, process 300 can update weights corresponding to the mesh and the RGBA images based on the errors for each training sample in the batch. In some embodiments, process 300 can update weights corresponding to any suitable aspects of the mesh and the RGBA images. For example, in some embodiments, process 300 can update weights corresponding to a depth of each vertex while keeping a corresponding (x, y) location constant. As another example, in some embodiments, process 300 can update weights corresponding to RGBA values to modify a color or a transmittance of each pixel.

In some embodiments, process 300 can update the weights based on a gradient of the loss or error function. For example, in some embodiments, process 300 can update the weights in an opposite direction of the gradient using the current mesh and the current RGBA images for each layer of the MDI to reduce an error in a next iteration. In some such embodiments, process 300 can update the weights using the gradient using any suitable learning rate α (e.g., 0.001, 0.003, 0.01, 0.03, 0.1, and/or any other suitable value).

Note that, in some embodiments, process 300 can aggregate losses or errors corresponding to each training sample of the batch across all of the training samples included in the batch in any suitable manner. For example, in some embodiments, process 300 can sum errors corresponding to each training sample in the batch when evaluating the loss function.

In some embodiments, process 300 can loop back to block 308 and can render the MDI using an updated mesh and updated RGBA images for each layer of the MDI, where the updated mesh and the updated RGBA images are based on the updated weights as calculated at block 312. In some embodiments, process 300 can loop through blocks 308-312 using the training samples included in the batch any suitable number of times (e.g., one hundred, one thousand, ten thousand, and/or any other suitable number). For example, process 300 can loop through blocks 308-312 using the training samples included in the batch for a certain number of iterations prior to generating a new batch of training samples.

Process 300 can then proceed to block 314 and can determine whether a predetermined stopping criteria has been reached. In some embodiments, the predetermined stopping criteria can include any suitable criteria. For example, in some embodiments, the predetermined stopping criteria can include whether an aggregate error of the training samples included in the batch of training samples using the current meshes and the current RGBA images for the layers of the MDI is below a predetermined threshold.

If, at block 314, process 300 determines that the predetermined stopping criteria have not been reached ("no" at 314), process 300 can loop back to block 304 and can generate a new batch of training samples. In some such embodiments, process 300 can then loop through blocks 306-312 with the new batch of training samples. In some embodiments, the new batch of training samples can have any suitable number of training samples (e.g., ten, twenty, 16, 32, and/or any other suitable number). For example, process 300 can repeatedly generate new batches of training samples until convergence or after a pre-specified number of iterations.

If, at block 314, process 300 determines that the predetermined stopping criteria have been reached ("yes" at 314), process 300 can end at 316.

Figure 4:
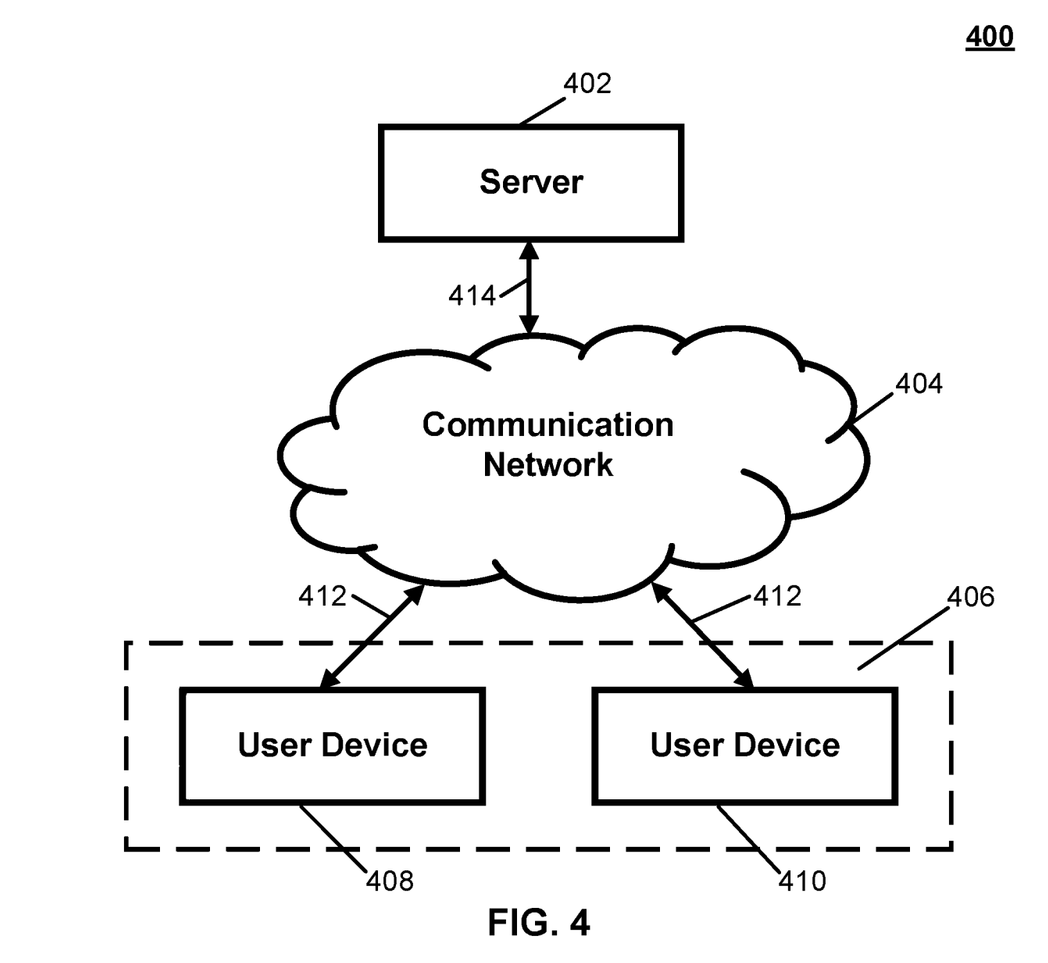
FIG. 4 shows a schematic diagram of an illustrative system suitable for implementation of mechanisms described herein for generating compressed images in accordance with some embodiments of the disclosed subject matter.

Turning to FIG. 4, a schematic diagram of an illustrative system 400 suitable for implementation of mechanisms described herein for generating compressed images in accordance with some embodiments of the disclosed subject matter. As illustrated, system 400 can include a server 402, a communication network 404, and/or one or more user devices 406, such as user devices 408 and 410.

Server 402 can be any suitable server(s) for storing information, data, programs, and/or any other suitable type of content. In some embodiments, server 402 can perform any suitable function(s). For example, in some embodiments, server 402 can be used to generate compressed images. As a more particular example, in some embodiments, server 402 can be used to generate an MDI by optimizing cuts of an MPI, as shown in and described above in connection with FIG. 2. As another more particular example, in some embodiments, server 402 can be used to train a neural network to generate MDIs, as shown in and described above in connection with FIG. 3. As another example, in some embodiments, server 402 can be used to transmit an MDI, or a sequence of MDIs, to a user device, as shown in and described above in connection with FIG. 1.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for presenting images, compressed images, sequences of images, and/or sequences of compressed images. In some embodiments, user devices 406 can include any suitable types of devices. For example, in some embodiments, user devices 406 can include a mobile device, a tablet computer, a laptop computer, a desktop computer, a wearable computer, a game console, a media player, a vehicle entertainment system, and/or any other suitable type of user device. Note that, in some embodiments, user devices 406 can additionally or alternatively be used to implement any of the functions described above in connection with FIGS. 2 and/or 3 to generate compressed images from a multi-plane image.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Figure 5:
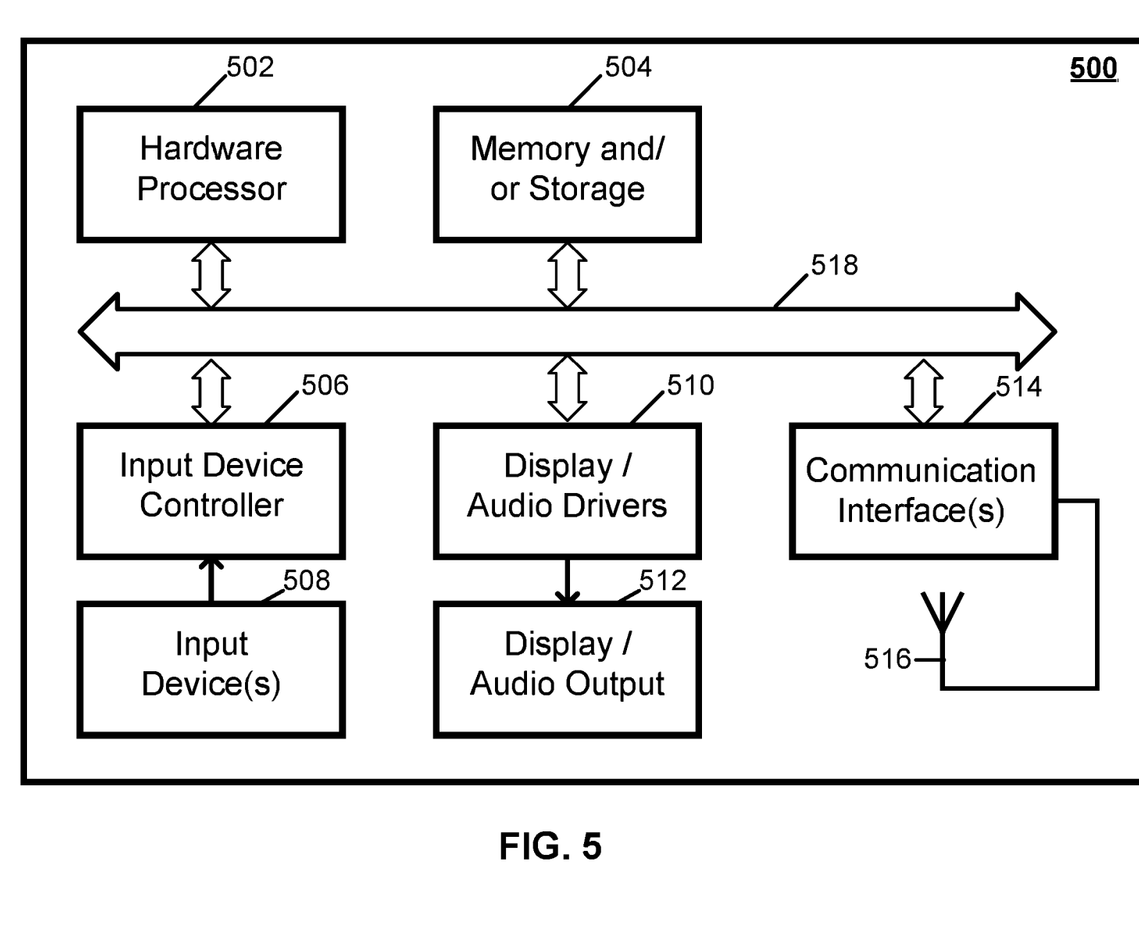
FIG. 5 shows a detailed example of hardware that can be used in a server and/or a user device of FIG. 4 in accordance with some embodiments of the disclosed subject matter.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 402. In some embodiments, hardware processor 502 can be controlled by a computer program stored in memory and/or storage 504 of user device 406.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIGS. 1-3 can be executed or performed in any order or sequence not limited to the order and sequence shown in and described in connection with the figures. Also, some of the above blocks of FIGS. 1-3 can be executed or performed substantially simultaneously where appropriate or in parallel to reduce latency and processing times. Additionally or alternatively, some of the above described blocks of the processes of FIGS. 1-3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for generating compressed images are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

The invention claimed is:

1. A method for generating compressed images, the method comprising:
    identifying a multi-plane image, MPI, that represents a three-dimensional image, wherein the MPI comprises a plurality of fronto-parallel planes;
    splitting the MPI into a plurality of sub-volumes, wherein each sub-volume in the plurality of sub-volumes includes a subset of the plurality of fronto-parallel planes;
    calculating, for each sub-volume of the MPI, a depthmap;
    converting each depthmap to a mesh, wherein each mesh corresponds to a layer of a plurality of layers associated with a multi-depth image, MDI, to be rendered;
    calculating, for each layer of the plurality of layers, an image; and
    storing the meshes corresponding to the plurality of layers of the MDI and the images corresponding to the plurality of layers of the MDI as the MDI.

2. The method of claim 1, wherein at least one of:
    each fronto-parallel plane of the plurality of fronto-parallel planes is associated with an image that indicates a color and a transmittance of each pixel of the fronto-parallel planes;
    each depthmap indicates a location and a depth of each voxel of the MDI included in the corresponding layer of the MDI, and wherein a number of layers in the plurality of layers associated with the MDI is less than a number of fronto-parallel planes included in the plurality of fronto-parallel planes associated with the MPI; or
    in response to receiving a request for the three-dimensional image from a user device, transmitting the MDI to the user device, wherein the user device is configured to render the MDI by mapping, for each layer of the MDI, the image corresponding to the layer as a texture on the mesh corresponding to the layer.

3. The method of claim 1, further comprising generating a sequence of MDI images corresponding to a sequence of MPI images, wherein the sequence of MPI images corresponds to three-dimensional video content.

4. The method of claim 1, wherein splitting the MPI into the plurality of sub-volumes comprises optimizing a plurality of cuts that generate the plurality of sub-volumes by minimizing a rendering error generated by rendering the MDI using the plurality of sub-volumes.

5. The method of claim 4, wherein the rendering error includes:
    a unary term that indicates an error in depth resulting from rendering the MDI using a cut of the plurality of cuts, or wherein the rendering error comprises a smoothness term that indicates a smoothness of a cut of the plurality of cuts across voxels included in a sub-volume of the plurality of sub-volumes corresponding to the cut.

6. The method of claim 1, wherein splitting the MPI into the plurality of sub-volumes comprises using a trained neural network to identify a plurality of cuts that generate the plurality of sub-volumes.

7. The method of claim 1, wherein each mesh corresponding to each layer of the MDI is a triangular mesh.

8. A system for generating compressed images, the system comprising:
a hardware processor that is configured to:
identify a multi-plane image, MPI, that represents a three-dimensional image, wherein the MPI comprises a plurality of fronto-parallel planes;
split the MPI into a plurality of sub-volumes, wherein each sub-volume in the plurality of sub-volumes includes a subset of the plurality of fronto-parallel planes;
calculate, for each sub-volume of the MPI, a depthmap;
convert each depthmap to a mesh, wherein each mesh corresponds to a layer of a plurality of layers associated with a multi-depth image, MDI, to be rendered;
calculate, for each layer of the plurality of layers, an image; and
store the meshes corresponding to the plurality of layers of the MDI and the images corresponding to the plurality of layers of the MDI as the MDI.

9. The system of claim 8, wherein at least one of:
each fronto-parallel plane of the plurality of fronto-parallel planes is associated with an image that indicates a color and a transmittance of each pixel of the fronto-parallel planes;
each depthmap indicates a location and a depth of each voxel of the MDI included in the corresponding layer of the MDI, and wherein a number of layers in the plurality of layers associated with the MDI is less than a number of fronto-parallel planes included in the plurality of fronto-parallel planes associated with the MPI; or
in response to receiving a request for the three-dimensional image from a user device, transmitting the MDI to the user device, wherein the user device is configured to render the MDI by mapping, for each layer of the MDI, the image corresponding to the layer as a texture on the mesh corresponding to the layer.

10. The system of claim 8, wherein the hardware processor is further configured to generate a sequence of MDI images corresponding to a sequence of MPI images, wherein the sequence of MPI images corresponds to three-dimensional video content.

11. The system of claim 8, wherein splitting the MPI into the plurality of sub-volumes comprises optimizing a plurality of cuts that generate the plurality of sub-volumes by minimizing a rendering error generated by rendering the MDI using the plurality of sub-volumes.

12. The system of claim 11, wherein the rendering error comprises:
a unary term that indicates an error in depth resulting from rendering the MDI using a cut of the plurality of cuts, or
the rendering error comprises a smoothness term that indicates a smoothness of a cut of the plurality of cuts across voxels included in a sub-volume from the plurality of sub-volumes corresponding to the cut.

13. The system of claim 8, wherein splitting the MPI into the plurality of sub-volumes comprises using a trained neural network to identify a plurality of cuts that generate the plurality of sub-volumes.

14. The system of claim 8, wherein each mesh corresponding to each layer of the MDI is a triangular mesh.

15. A non-transitory computer-readable medium containing computer executable instructions that, when executed by a processor, cause the processor to perform a method for generating compressed images, the method comprising:
identifying a multi-plane image, MPI, that represents a three-dimensional image, wherein the MPI comprises a plurality of fronto-parallel planes;
splitting the MPI into a plurality of sub-volumes, wherein each sub-volume in the plurality of sub-volumes includes a subset of the plurality of fronto-parallel planes;
calculating, for each sub-volume of the MPI, a depthmap;
converting each depthmap to a mesh, wherein each mesh corresponds to a layer of a plurality of layers associated with a multi-depth image, MDI, to be rendered calculating, for each layer of the plurality of layers, an image; and
storing the meshes corresponding to the plurality of layers of the MDI and the images corresponding to the plurality of layers of the MDI as the MDI.

16. The non-transitory computer-readable medium of claim 15, wherein the method further comprises generating a sequence of MDI images corresponding to a sequence of MPI images, wherein the sequence of MPI images corresponds to three-dimensional video content.

17. The non-transitory computer-readable medium of claim 15, wherein splitting the MPI into the plurality of sub-volumes comprises optimizing a plurality of cuts that generate the plurality of sub-volumes by minimizing a rendering error generated by rendering the MDI using the plurality of sub-volumes.

18. The non-transitory computer-readable medium of claim 17, wherein the rendering error comprises a unary term that indicates an error in depth resulting from rendering the MDI using a cut of the plurality of cuts.

19. The non-transitory computer-readable medium of claim 17, wherein the rendering error comprises a smoothness term that indicates a smoothness of a cut of the plurality of cuts across voxels included in a sub-volume from the plurality of sub-volumes corresponding to the cut.

20. The non-transitory computer-readable medium of claim 15, wherein splitting the MPI into the plurality of sub-volumes comprises using a trained neural network to identify a plurality of cuts that generate the plurality of sub-volumes.

21. The non-transitory computer-readable medium of claim 15, wherein each mesh corresponding to each layer of the MDI is a triangular mesh.

* * * * *